(12) United States Patent  
Cotgrove (10) Patent No.: US 9,296,424 B2  
(45) Date of Patent: Mar. 29, 2016

(54) VEHICLE MOTION CONTROL APPARATUS AND METHOD

(75) Inventor: Tim Cotgrove, Southam (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/127,924

(22) PCT Filed: Jun. 28, 2012

(86) PCT No.: PCT/EP2012/062629  
§ 371 (c)(1),  
(2), (4) Date: Mar. 10, 2014

(87) PCT Pub. No.: WO2013/001033  
PCT Pub. Date: Jan. 3, 2013

(65) Prior Publication Data  
US 2014/0297120 A1    Oct. 2, 2014

(30) Foreign Application Priority Data

Jun. 30, 2011    (GB) .................................. 1111203.4

(51) Int. Cl.  
*A01B 69/00* (2006.01)  
*B62D 15/02* (2006.01)  
*B60T 8/1755* (2006.01)

(52) U.S. Cl.  
CPC ........... *B62D 15/025* (2013.01); *B60T 8/17552* (2013.01); *B60T 2201/16* (2013.01); *B60T 2230/02* (2013.01); *B60T 2270/302* (2013.01); *B60T 2270/303* (2013.01)

(58) Field of Classification Search  
CPC .................................................... B62D 15/025

USPC ...................... 701/41, 42, 70, 72, 90; 180/197  
See application file for complete search history.

(56) References Cited

U.S. PATENT DOCUMENTS

| 5,839,799 | A | 11/1998 | Fukada | |
|---|---|---|---|---|
| 6,079,799 | A * | 6/2000 | Sawada et al. | ................ 303/146 |
| 8,249,790 | B2 * | 8/2012 | Kato | ................ 701/71 |
| 2011/0046849 | A1 | 2/2011 | Visconti et al. | |

FOREIGN PATENT DOCUMENTS

| DE | 19964032 A1 | 7/2001 |
|---|---|---|
| DE | 10130659 A1 | 1/2003 |
| DE | 102008029894 A1 | 12/2009 |
| JP | H02299975 A | 12/1990 |
| JP | H0999826 A | 4/1997 |
| JP | 2005349887 A | 12/2005 |

(Continued)

OTHER PUBLICATIONS

International Search Report for PCT/EP2012/062629, dated Sep. 20, 2012, 3 pages.  
Combined Search and Examination Report corresponding to application No. GB1111203.4, dated Oct. 27, 2011, 6 pages.  
Japanese Office action corresponding to application No. JP2014517717, dated Jun. 23, 2015. Not translated, 3 pages.

*Primary Examiner* — Luke Huynh  
(74) *Attorney, Agent, or Firm* — Reising Ethington P.C.

(57) ABSTRACT

Embodiments of the present invention provide a vehicle sideslip control system for maintaining a non-zero value of sideslip while cornering. The system comprises a vehicle sideslip controller operable automatically to control the vehicle to apply a positive or negative torque to one or more wheels of the vehicle in such a manner as to maintain the non-zero value of sideslip.

15 Claims, 5 Drawing Sheets

(56) References Cited

FOREIGN PATENT DOCUMENTS

| JP | 2007062654 | A | 3/2007 |
| WO | WO 2007093969 | A1 * | 8/2007 |
| WO | 2009146826 | A1 | 12/2009 |

* cited by examiner

VEHICLE MOTION CONTROL APPARATUS AND METHOD

FIELD OF THE INVENTION

The present invention relates to a system and a method for controlling vehicle motion. In particular but not exclusively the invention relates to a system and a method for controlling a vehicle whilst cornering. Aspects of the invention relate to an apparatus, to a system, to a method and to a vehicle.

BACKGROUND

It is known to provide an electronic stability control (ESC) system (sometimes also referred to as a dynamic stability control (DSC) system) for reducing a risk of loss of traction of a motor vehicle. ESC systems have been found to be particularly effective in recovery of a vehicle from a loss of traction scenario when cornering.

ESC systems typically monitor steering wheel angle or steerable road wheel angle and vehicle direction and determine a difference (or error) between the drivers intended direction of travel (determined through the measured steering wheel angle) and the vehicle's actual direction (determined through measurements of lateral acceleration, yaw and the speed of rotation of each road wheel).

If the ESC system determines that the error exceeds a prescribed value indicating that the vehicle is skidding about the vehicle's vertical axis, the system estimates the direction of the skid and then applies braking to individual wheels in order to create torque about the vertical axis opposing the skid. In some arrangements the system also slows the vehicle, for example by reducing engine power.

ESC systems employ the anti-lock braking system (ABS) to brake individual wheels as required. Furthermore, a traction control system (TCS) may be incorporated into the ESC system. TCS systems detect drive wheel slip under acceleration and apply negative torque (braking) to the slipping wheel and/or reduce engine power until traction is regained.

ESC systems typically receive signals corresponding to steering wheel position, lateral acceleration, yaw and a speed of rotation of each wheel.

In addition, in some known arrangements the ESC system also receives data corresponding to a value of roll rate of the vehicle and to a ratio of the value of the longitudinal acceleration of the vehicle to the value of the coefficient of friction between wheels of the vehicle and the driving surface The value of the coefficient of friction is an estimated value whilst the values of longitudinal acceleration and roll rate are measured values. The value of longitudinal acceleration may provide additional information in respect of surface pitch and provide a further source of vehicle acceleration and speed data. The value of roll rate may be helpful in defining a more precise vehicle state model being a model describing motion of the vehicle at a given moment in time.

In some arrangements an intended state of the vehicle (i.e. the state intended by the driver) is determined based upon the steering wheel angle, rate of change of steering wheel angle and road wheel speed. The actual state of the vehicle is determined by reference to a signal from a yaw sensor indicating a rate of yaw of the vehicle. The ESC system calculates a value of positive or negative torque that should be applied to each wheel and then applies the torque to the wheels in order to reduce the difference between the actual state of the vehicle and the state intended by the driver.

ESC systems are generally considered to improve vehicle safety, in particular for novice and inexperienced drivers, by elimination of sideslip. A typical ESC system will for example provide a control input as soon as a deviation from the intended path of travel is detected. Such systems have the potential disadvantage that a driver may never experience sideslip, and thus learn how to manually provide a corrective input.

In some circumstances drivers of motor vehicles on racetracks or skidpans perform controlled sideslip manoeuvres in which they induce sideslip of the vehicle during cornering. If the vehicle is fitted with an ESC system or the like such manoeuvres can be difficult or impossible to perform unless the ESC system is disabled. Disabling of the ESC system is inadvisable since if a driver subsequently finds himself in a situation where he loses control, the ESC system is unable to assist.

WO-A-2009/146826 discloses a modified ESC system whereby a non-zero sideslip angle is allowed for side to side variation of tyre/road friction; a maximum range of 0.5°-8° is mentioned. The purpose of this open loop system is not clear, but it may reduce demand on the ESC control processor. The system is permissive, and delays operation of ESC until a threshold deviation is reached.

It is an aim of embodiments of the present invention to at least partially mitigate the disadvantages of known ESC systems, whilst providing for an enhanced driving experience.

STATEMENT OF THE INVENTION

According to one aspect of the invention there is provided a vehicle sideslip control system for maintaining a non-zero value of a sideslip angle whilst cornering, the system comprising a vehicle sideslip controller operable automatically to control the vehicle to apply a positive or negative torque to one or more wheels of the vehicle in such a manner as to maintain the non-zero value of sideslip angle.

Embodiments of the invention have the advantage that a driver may perform a controlled sideslip manoeuvre with the assistance of the vehicle sideslip control system (VCS). The VCS may continue to monitor the manoeuvre without a requirement and intervene to prevent the sideslip angle exceeding a prescribed value. Thus the VCS continues to monitor and control vehicle traction, and provides closed loop control.

In contrast, in known vehicles having an ESC system, TCS or the like the driver must fully deactivate the system in order to perform a prolonged sideslip manoeuvre. The systems therefore provide no assistance with the manoeuvre and will not intervene in the event the driver loses control of the vehicle.

The system of the invention may be arranged to determine an intended path of the vehicle responsive to one or more driver control inputs, the system being arranged to maintain the value of sideslip angle relative to the intended path.

It is to be understood that the direction of intended path may correspond to a direction for which the steering wheel angle selected by the driver allows the vehicle to travel with substantially zero yaw.

Advantageously the sideslip controller may be operable automatically to control the vehicle to assume and maintain the non-zero value of sideslip angle when one or more prescribed sideslip control entry conditions are met.

Optionally the one or more prescribed sideslip control entry conditions include at least one selected from amongst the conditions that a transmission of the vehicle is set to a gear ratio within a prescribed range, a steering angle is within a prescribed range, an accelerator pedal position is within a prescribed range, a value of longitudinal slip of one or more driven wheels of the vehicle is greater than a prescribed value, a value of lateral slip of one or more wheels of the vehicle is greater than a prescribed value and a direction of yaw of the vehicle corresponds to a direction appropriate for the sideslip condition to be established.

In some embodiments, by direction of yaw is meant that the direction is in the correct sense (i.e. yaw to the left or yaw to the right).

Advantageously when the sideslip controller is controlling the vehicle to maintain the non-zero value of sideslip angle the controller is arranged automatically to control the vehicle to reduce the value of sideslip angle when one or more prescribed sideslip control exit conditions are met.

Optionally the prescribed one or more sideslip control exit conditions include at least one selected from amongst the conditions that the transmission of the vehicle is set to a gear ratio that is not within the prescribed range for sideslip control entry, the steering angle is set to a value that is not within the prescribed range for sideslip control entry, the accelerator pedal position is not within the prescribed range for sideslip control entry, the value of longitudinal slip of one or more driven wheels of the vehicle is less than the prescribed value for sideslip control entry, a value of lateral slip of one or more wheels of the vehicle is less than the prescribed value for sideslip control entry and the direction of yaw of the vehicle corresponds to a direction that is not appropriate for the sideslip condition established.

Advantageously the sideslip controller is operable to terminate maintenance of the non-zero sideslip angle when said one or more prescribed sideslip control exit conditions are met.

Optionally the sideslip controller is operable to determine a value of sideslip angle appropriate for a vehicle path selected by a driver, the vehicle path being determined by the controller responsive to steering angle selected by the driver.

It is to be understood that steering angle may be selected by the driver by means of a steering wheel of the vehicle.

Alternatively or in addition the sideslip controller is operable to control the vehicle to maintain a substantially constant radius of turn by varying the value of sideslip angle responsive to steering angle selected by the driver.

The radius of turn may be selected by the driver to be one of a plurality of values, for example by means of an input selector such as a control dial or knob, a soft key, a touch screen or any other suitable means.

According to another aspect of the invention there is provided a vehicle comprising a vehicle sideslip control system according to the preceding aspect.

The vehicle may be a four wheel drive vehicle or a two wheel drive vehicle.

Optionally the vehicle is operable in a two wheel drive or four wheel drive mode.

According to a further aspect of the invention there is provided a method of controlling a vehicle comprising the steps of: determining that a driver wishes to establish a non-zero value of sideslip; and controlling the vehicle by means of vehicle sideslip control means automatically to maintain a non-zero value of sideslip by applying positive or negative torque to one or more wheels of the vehicle.

The method thus allows a closed loop drift mode to be selected, whereby a predetermined non-zero sideslip is maintained whilst permitting the vehicle driver to make accelerator pedal and steering inputs.

Within the scope of this application it is envisaged that the various aspects, embodiments, examples, features and alternatives set out in the preceding paragraphs, in the claims and/or in the following description and drawings may be taken independently or in any combination. For example, features described in connection with one embodiment are applicable to all embodiments, unless there is incompatibility of features.

BRIEF DESCRIPTION OF THE DRAWINGS

Embodiments of the invention will now be described, by way of example only, with reference to the accompanying figures in which:

FIG. 1 shows (a) is a schematic illustration of a motor vehicle according to an embodiment of the present invention showing a condition in which front wheels of the vehicle experience sideslip and (b) a schematic illustration of a motor vehicle according to an embodiment of the present invention showing a condition in which both front and rear wheels of the vehicle experience sideslip;

DETAILED DESCRIPTION

Figure 1A:
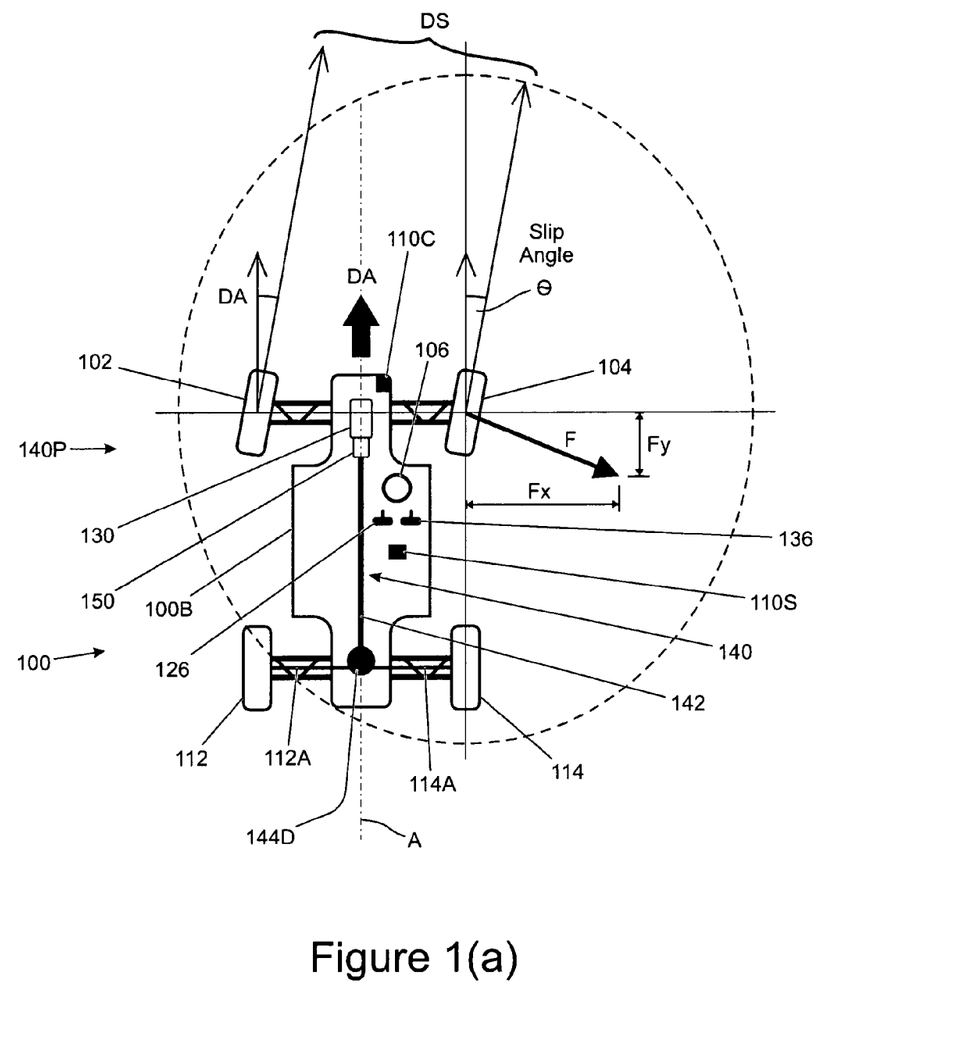
Figure 1B:
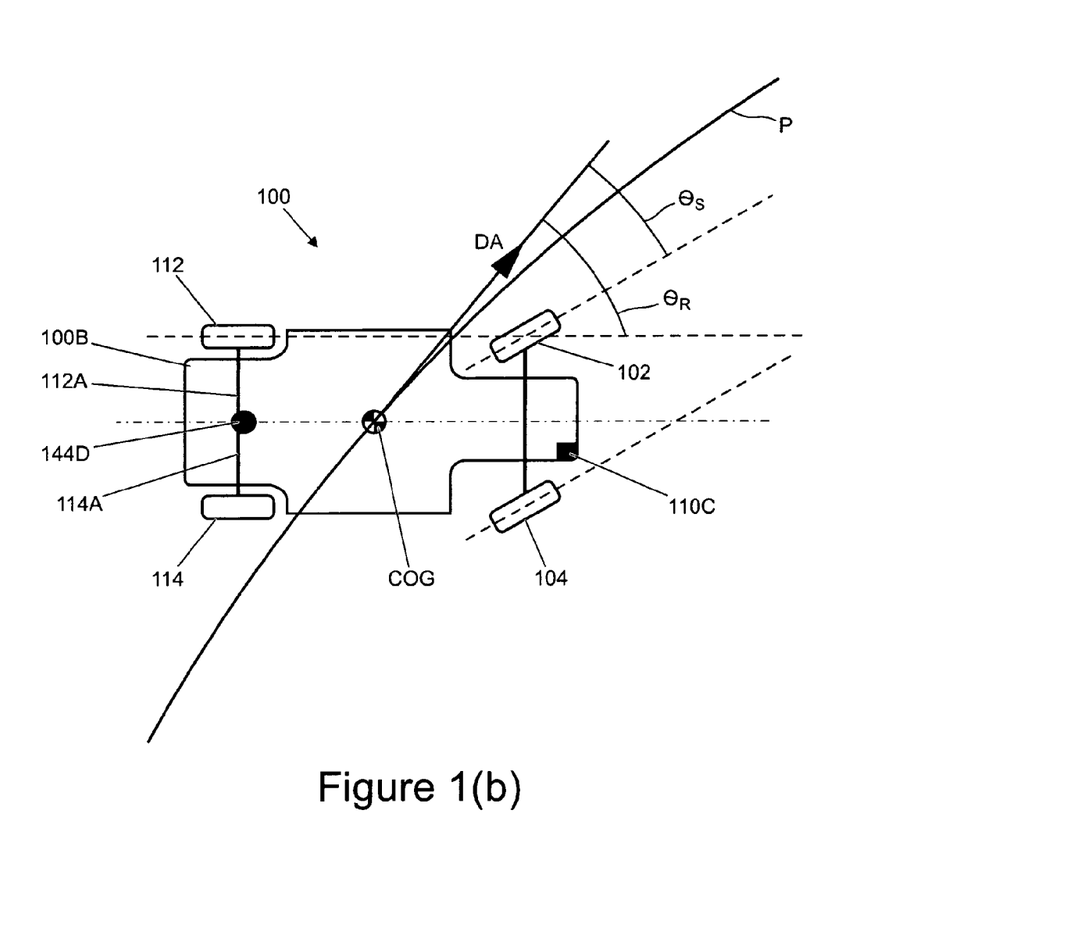

FIG. 1 shows a vehicle 100 according to an embodiment of the present invention. The vehicle has a body 100B, a pair of steerable front road wheels 102, 104 and a pair of non-steerable rear wheels 112, 114. The steerable road wheels 102, 104 are steerable by means of a steering wheel 106.

The vehicle has an engine 130 operable to apply torque to a driveline 140 of the vehicle 100 to drive the rear wheels 112, 114. The driveline 140 includes a driveshaft (or propshaft) 142 arranged to drive left and right rear axles 112A, 114A by means of a differential 144D. An accelerator pedal 136 and a brake pedal 126 are provided to allow a driver to control a speed of the vehicle 100. A combination of engine 130, transmission 150 and driveline 140 may be referred to as a powertrain 140P.

In FIG. 1(a) the vehicle 100 is shown in a dynamic situation in which the vehicle 100 is moving in the direction of arrow DA (which is parallel to a longitudinal axis A of the vehicle 100). However the steerable road wheels are pointing in a direction corresponding to movement of the vehicle 100 in direction DS which is not parallel to DA. Rather, DS differs from DA by angle θ.

The direction DS may be understood to correspond to an intended direction of travel of the vehicle 100. Thus the front wheels 102, 104 of the vehicle 100 have a component of their direction of travel that is normal to the direction in which they are pointing, indicating that the front wheels 102, 104 are experiencing sideslip.

In FIG. 1(b) the vehicle 100 is shown in a cornering situation in which a centre of gravity (COG) of the vehicle 100 follows a path P. A direction of travel of the vehicle 100 at a given moment in time is shown by arrow DA being a line tangential to the path P and passing through the COG of the vehicle 100. It can be seen that an angle of sideslip of rear wheels 112, 114 is given by angle $\theta_R$ whilst an angle of sideslip of steerable front wheels 102, 104 is given by angle $\theta_S$ which is less than $\theta_R$ in the example shown.

Figure 2:
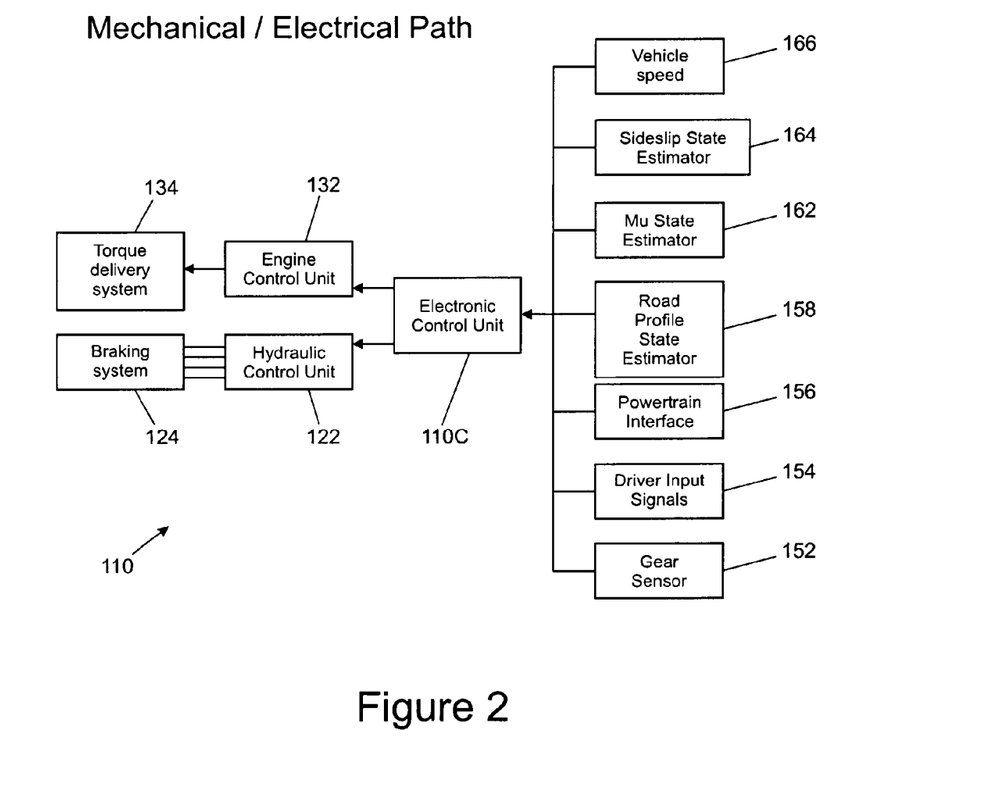
FIG. 2 shows a mechanical/electrical flowpath of a vehicle according to the embodiment of FIG. 1.

The vehicle 100 has a control system 110 illustrated schematically in FIG. 2. The system 110 is arranged to implement a closed-loop feedback control methodology in order to establish and maintain a constant angle of sideslip $\theta_R$ of the vehicle 100 under the control of a vehicle control unit (VCU) 110C.

The VCU 110C is arranged to provide control signals to a hydraulic control unit 122 which in turn controls a braking sub-system 124 to apply a required amount of negative torque to respective wheels 102, 104, 112, 114 of the vehicle 100. The VCU 110C also provides control signals to an engine control unit 132 which in turn provides commands to a torque delivery sub-system 134. The torque delivery sub-system 134 is operable to apply a required amount of positive torque to a respective one of the rear wheels 112, 114 via the driveline 140.

In some embodiments the driveline 140 may be arranged to apply a torque to the front wheels 102, 104 whilst in some embodiments the driveline 140 may be arranged to apply positive torque to all four wheels 102, 104, 112, 114. In some embodiments the driveline 140 may be operable under the control of a vehicle controller selectively to supply positive torque to only two or to all four wheels of the vehicle 100.

The VCU 110C is arranged to receive input signals as illustrated schematically in FIG. 2. The VCU 110C receives a gear sensor signal 152 indicating the selected gear of the transmission 150. In some arrangements the signal 152 indicates a current gear ratio of the transmission 150 whilst in some embodiments the VCU 110C is arranged to determine the selected gear ratio responsive to the value of the gear sensor signal 152.

A plurality of driver input signals 154 are also received by the VCU 110C. These include signals indicative of a position of the accelerator pedal 136, brake pedal 126 and steering wheel 106.

A powertrain interface provides a powertrain state signal 156 providing data in respect of a state of the engine 130 and driveline 140.

Wheel speed sensors are provided and arranged to provide a signal corresponding to a speed of rotation of each wheel 102, 104, 112, 114 to an ABS control module 124C of the braking sub-system 124. The braking sub-system 124 in turn provides an output signal to a controller area network (CAN) of the vehicle 100.

A road profile state estimator provides the VCU 110C with a road profile state estimate signal 158 corresponding to an estimate of a pitch of a surface over which the vehicle 100 is driving, i.e. a gradient of the surface with respect to a horizontal plane.

A mu state estimator provides the VCU 110C with a mu state signal 162 that is responsive to a coefficient of friction between the surface over which the vehicle is driving and wheels of the vehicle 100.

A side slip state estimator provides the VCU 110C with a side slip signal 164 corresponding to an estimate of a value of sideslip of a rear axle $\theta_R$ being an angle between a direction in which rear wheels 112, 114 are pointing and a direction of travel of the vehicle 100 and an estimate of a corresponding sideslip of steerable wheels 102, 104 $\theta_S$. This signal completes a feedback loop allowing the VCU 110C to establish and maintain a required value of rear sideslip angle $\theta_R$.

A vehicle speed signal 166 indicating a speed of the vehicle 100 is also provided to the VCU 110C.

Figure 3:
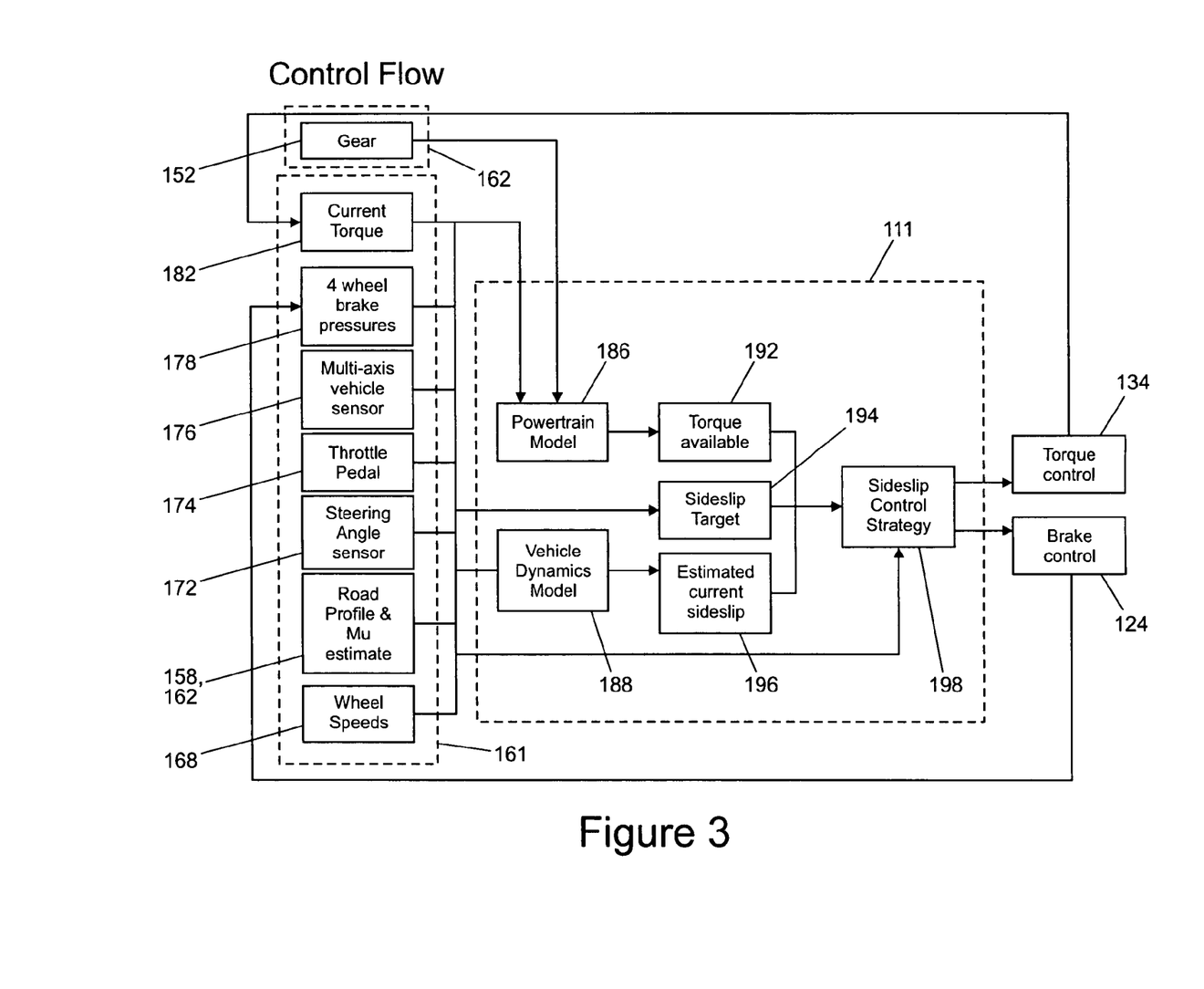
FIG. 3 shows a control flowpath of a vehicle according to the embodiment of FIG. 1.

FIG. 3 is a schematic illustration of a flow of control signals associated with the vehicle 100 of the embodiment of FIG. 1.

The VCU 110C is configured to provide a first set of vehicle state signals 161 to a powertrain model function block 186, a sideslip target function block 194, a vehicle dynamics model function block 188 and a sideslip control strategy function block 198.

By function block is meant a portion of hardware or of software code implemented in a computing device that is arranged to perform one or more operations in respect of data input to the function block. In the present embodiment the VCU 110C is arranged to implement the function blocks at 111 in FIG. 3 in software that is executed by the VCU 110C. In some embodiments one or more different computing devices may be arranged to implement the functionality of FIG. 3.

The vehicle dynamics model function block 188 provides a continually updated description of a state of the vehicle 100, describing translational motion of the vehicle and rotational motion about each of three orthogonal axes.

The powertrain model function block 186 provides a continually updated description of a state of the powertrain of the vehicle including an amount of torque applied to each of the driven wheels 112, 114 of the vehicle 100.

The first set of state signals 161 are as follows:

i) a wheel speed signal 168 providing a speed of each wheel 102, 104, 112, 114 of the vehicle 100;

ii) the road profile state estimate signal 158 and mu state signal 162;

iii) a steering angle signal 172 being a signal responsive to an angular position of the steering wheel 106;

iv) an accelerator (or throttle) pedal position signal 174 being a signal responsive to a position of the accelerator pedal 136;

v) a multi-axis vehicle sensor signal 176 providing a signal responsive to a rate of rotation of the vehicle 100 about each of three orthogonal axes X, Y, Z of the vehicle 100, i.e. a signal indicating a rate of roll, pitch and yaw of the vehicle 100 about these axes and a signal responsive to a rate of acceleration in a direction parallel to each of the axes X, Y, Z;

vi) a four-wheel brake pressure signal 178 responsive to a brake pressure on each of the four wheels 102, 104, 112, 114 of the vehicle 100; and vii) a current torque signal 182 corresponding to a current value of torque applied to each of the 4 wheels 102, 104, 112, 114 of the vehicle 100.

In addition to the first set of state signals 161 a second set of state signals 162 (in the present embodiment the second set consists of the gear sensor signal 152 only) is also fed to the powertrain model function block 186. In some embodiments the second set of state signals comprises a plurality of respective state signals. It is to be understood that the gear sensor signal 152 is required by the powertrain model function block 186 in order to determine the amount of torque being applied to the driven wheels 112, 114.

The powertrain model function block 186 outputs an available torque output signal 192 corresponding to an amount of torque that can be provided to each of the driven wheels 112, 114. The available torque output signal 192 is provided to the sideslip control strategy function block 198 and places a constraint on values of torque that may be demanded by the function block 198.

The sideslip target function block 194 is arranged to determine a target value of sideslip angle $\theta_R$ that is to be assumed by the vehicle 100 responsive to the first set of state signals 161 and to output this value to the sideslip control strategy function block 198.

The vehicle dynamics model function block 188 is arranged to output a signal 196 corresponding to an estimated current value of sideslip of the vehicle 100. The estimated current value of sideslip 196 is output to the sideslip control strategy function block 198.

The sideslip control strategy function block 198 is arranged to determine a required value of positive or negative torque that is to be applied to the rear wheels 112, 114 by means of the braking system 124 and torque delivery system 134 and a required value of negative torque to be applied to the front wheels 102, 104 by means of the braking system 124. The required torque values are determined to be those required to establish and maintain the vehicle in a sideslip condition at the target value of sideslip angle $\theta_R$.

It is to be understood that the VCU 110C is arranged continually to monitor the plurality of driver input signals 154 and in particular the steering angle signal 172 in order to determine a path that the driver intends the vehicle 100 to follow. The VCU 110C controls the vehicle 100 to follow that path at the required sideslip angle $\theta_R$.

The VCU 110C is arranged to determine that a driver wishes to initiate sideslip of the vehicle 100 when a prescribed set of criteria are met. When the criteria are met the VCU 110C assumes control of the application of torque to the wheels 102, 104, 112, 114 in order to attain and maintain a required angle of sideslip angle $\theta_R$.

Firstly the driver must select a VCU-controlled sideslip mode of the vehicle 100 by means of a VCU-controlled sideslip mode selector 110S which may also be referred to as a 'drift mode' selector. Secondly the driver must initiate sideslip of the vehicle 100 by means of certain control actions. The control actions include inducing loss of traction by depressing the accelerator pedal 136 beyond a prescribed amount and inducing both lateral and longitudinal wheel slip.

The criteria for the VCU 110C to assume control of the application of torque as noted above are shown in the flow chart of FIG. 4(*a*). It is to be understood that the steps set out in the flow chart are continually performed by the VCU 110C whenever the vehicle 100 is not in a controlled sideslip manoeuvre and the drift mode selector 110S has been set to drift mode in order to determine whether the driver wishes to initiate a controlled sideslip manoeuvre.

Figure 4:
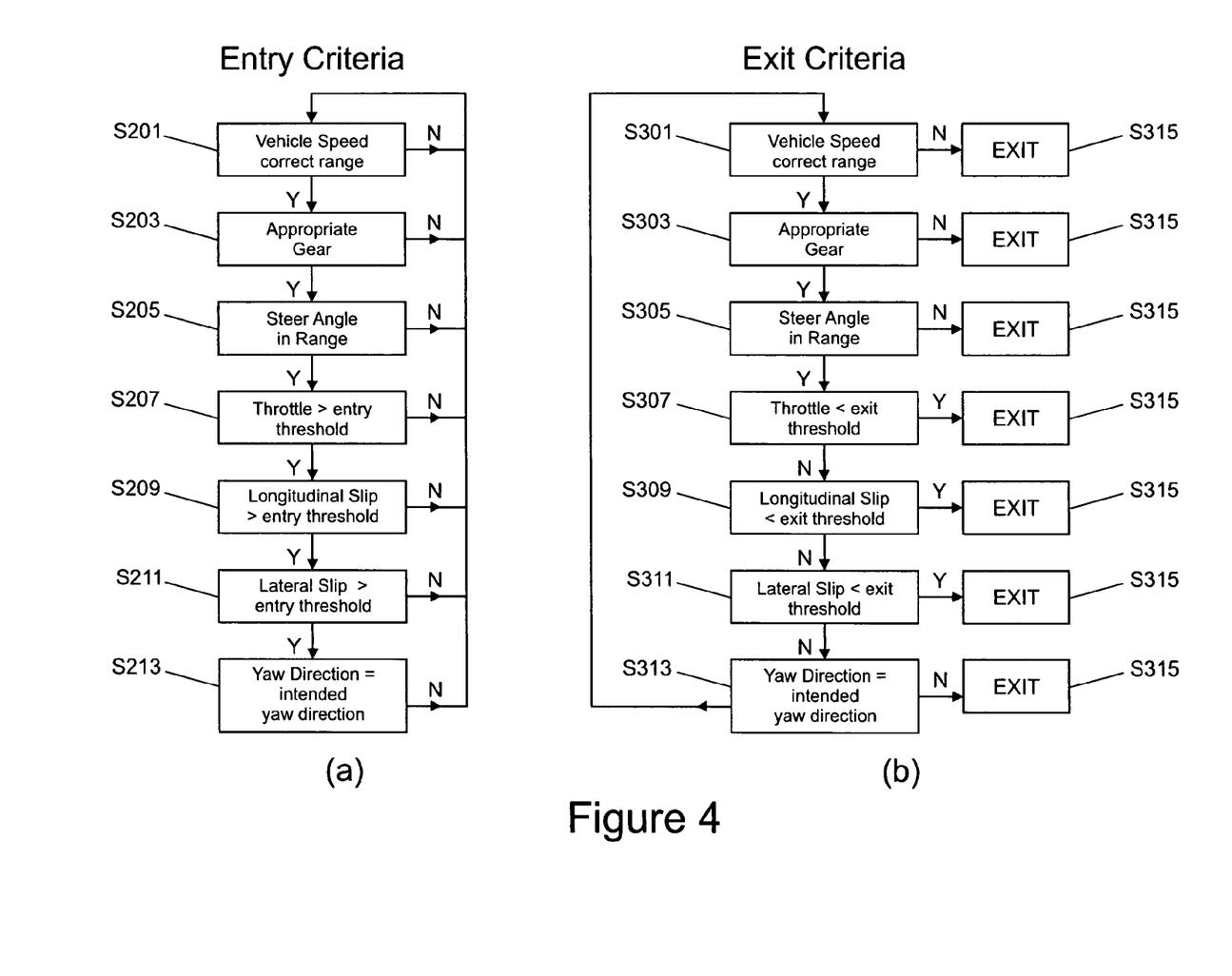
FIG. 4 shows a flow diagram of a process executed by a controller of a vehicle according to the embodiment of FIG. 1, (a) when the controller has not yet commenced controlling the vehicle to maintain a nonzero value of sideslip; and (b) whilst the controller is controlling the vehicle to maintain a nonzero value of sideslip.

At step S201 the VCU 110C determines whether the speed of the vehicle 100 is within a prescribed range within which VCU-controlled sideslip mode is permitted. If the VCU 110C determines the speed is not within the prescribed range the VCU 110C continues to execute step S201 until the speed is within the prescribed range.

If the speed of the vehicle 100 is within the prescribed range then at step S203 the VCU 110C determines whether the gear sensor signal 152 corresponds to an appropriate gear for entry into VCU-controlled sideslip mode. If the gear sensor signal 152 does not correspond to an appropriate gear then the VCU 110C continues at step S201.

If the gear sensor signal 152 does correspond to an appropriate gear then at step S205 the VCU 110C determines whether the steering angle signal 172 indicates that the steering wheel 106 is at an angular position that is within a prescribed range of angular positions for entry into VCU-controlled sideslip mode. If the steering angle signal 172 is not within the prescribed range then the VCU 110C continues at step S201.

If the steering wheel 106 is at an angular position within the prescribed range then at step S207 the VCU 110C determines whether the accelerator pedal position signal 174 indicates that the accelerator pedal 136 is at a position within a prescribed range of positions for entry into VCU-controlled sideslip mode. If the accelerator pedal 136 is not at a position within the prescribed range then the VCU 110C continues at step S201.

If the accelerator pedal 136 is at a position within the prescribed range then at step S209 the vehicle determines whether a value of longitudinal slip of the driven wheels 112, 114 is greater than an entry threshold value. It is to be understood that the VCU 110C is arranged to require the driver to initiate loss of traction of the driven wheels in the longitudinal direction, i.e. loss of traction is due at least in part to wheel spin. The value of longitudinal slip is determined by reference to the speed of rotation of the wheels 112, 114 and a speed and direction in which the vehicle 100 is moving.

If the value of longitudinal slip does not exceed the entry threshold value then the VCU 110C continues at step S201.

If the value of longitudinal slip does exceed the entry threshold value then at step S211 the VCU 110C is arranged to determine whether a value of lateral slip of the driven wheels 112, 114 also exceeds an entry threshold value. By lateral slip is meant a value of slip along a direction normal to the direction in which the wheels 112, 114 are pointing. In the case of the rear wheels 112, 114 the wheels point in a direction substantially parallel to the longitudinal axis A of the vehicle 100.

If the value of lateral slip does not exceed the entry threshold value then the VCU 110C continues at step S201.

If the value of lateral slip does exceed the entry threshold value then at step S213 the VCU 110C is arranged to determine whether a current direction of yaw of the vehicle 100 corresponds to an intended direction of yaw. If the current direction of yaw does not correspond to the intended direction then the VCU 110C continues at step S201. The purpose of this check is to identify circumstances in which a road surface or the vehicle 100 will not permit a stable sideslip manoeuvre to be performed.

If at step S213 the VCU 110C determines that the current direction of yaw does correspond to the intended direction and therefore that each of the conditions at steps S201 to S213 are met then the vehicle assumes the VCU-controlled sideslip mode. The VCU 110C provides control signals to the torque delivery system 134 and braking system 124 to establish and maintain the vehicle 100 in a sideslip condition at a prescribed angle of sideslip $\theta_R$.

The VCU 110C is arranged continually to monitor the first and second sets of vehicle state signals 161, 162 in order to ensure the vehicle 100 maintains the required sideslip angle $\theta_R$.

In some embodiments the sideslip angle $\theta_R$ is a fixed value regardless of the value of the vehicle speed signal 166 or other parameters such as vehicle cornering radius. In some embodiments the sideslip angle $\theta_R$ is calculated responsive to one or more vehicle signals or parameters such as the vehicle speed signal 166, steering angle signal 172, a rate of change of steering angle signal 172, the accelerator pedal position signal 174, cornering radius and/or one or more other signals.

The VCU 110C is also arranged continuously to monitor the first and second sets of state signals 161, 162 in order to determine whether a condition exists indicating that the driver wishes to exit the VCU-controlled sideslip mode.

FIG. 4(*b*) shows a sequence of checks made by the VCU 110C in order to determine whether the VCU-controlled sideslip mode should be exited.

At step S301 the VCU 110C determines whether the speed of the vehicle 100 is within a prescribed speed range for maintaining the non-zero value of sideslip. If the speed is not within the prescribed range the VCU 110C proceeds to step S315 at which the VCU 110C executes an exit sequence in which the vehicle 100 is returned to a condition of substantially no sideslip.

If at step S301 the VCU 110C determines that the vehicle 100 is within the prescribed speed range for maintaining the non-zero value of sideslip the VCU 110C proceeds to step S303. At step S303 the VCU 110C determines whether a selected gear ratio of the transmission 150 is still within a prescribed range for maintaining the non-zero value of sideslip. If the gear ratio is within the prescribed range the VCU 110C continues to step S305 else the VCU 110C continues to step S315.

At step S305 the VCU 110C determines whether the steering angle signal 172 indicates that the steering wheel 106 is at an angular position within a prescribed range for maintaining the nonzero value of sideslip. If the steering wheel 106 is within the prescribed range the VCU 110C continues to step S307 else the VCU 110C continues to step S315.

At step S307 the VCU 110C determines whether the accelerator pedal position signal 174 indicates that the accelerator pedal 136 is at a position within a prescribed range for maintaining the nonzero value of sideslip.

If the accelerator pedal 136 is at a position within the prescribed range the VCU 110C continues to step S309 else the vehicle 100 continues to step S315.

At step S309 the VCU 110C determines whether the value of longitudinal slip of the driven wheels 112, 114 is greater than a threshold value for maintaining the non-zero value of sideslip.

If the value of longitudinal slip does exceed the threshold value then the VCU 110C continues to step S311 else the VCU 110C continues to step S315.

At step S311 the VCU 110C determines whether the value of lateral slip of the driven wheels 112, 114 exceeds a threshold value for maintaining the non-zero value of sideslip. If the value does exceed the threshold the VCU 110C continues at step S313 else the VCU 110C continues at step S315.

At step S313 the VCU 110C is arranged to determine whether a current direction of yaw of the vehicle 100 corresponds to an intended direction of yaw. If the current direction of yaw does correspond to the intended direction and therefore each of the conditions at steps S301 to S313 are met then the VCU 110C continues at step S301. The vehicle continues to provide control signals to the torque delivery system 134 and braking system 124 to maintain the vehicle 100 at the prescribed angle of sideslip $\theta_R$.

However if the current direction of yaw does not correspond to the intended direction the VCU 110C continues at step S315.

In the embodiment illustrated, the driver may initiate a sideslip manoeuvre by selecting drift mode by means of the drift mode selector 110S. The VCU 110C then performs the steps set out in FIG. 4(a) in anticipation of being triggered to establish and maintain a prescribed angle of sideslip or 'drift', i.e. to cause the vehicle to assume the VCU-controlled sideslip mode.

The angle of the steering wheel 106 and rate of change of this angle provides a valuable indication of the driver's intended path of travel throughout the process. In order to initiate drift the driver will typically turn the steering wheel 106 through a sufficiently high angle at a sufficiently high rate.

Typically, a driver will subsequently depress the accelerator pedal 136 to initiate longitudinal and lateral wheel slip, and drift may for example be initiated upon depression of the accelerator pedal to the maximum extent.

It is to be understood that the VCU 110C is configured such that the driver must take positive action to initiate drift before VCU-controlled sideslip mode is assumed.

Once the VCU 110C has determined that the driver has correctly initiated a side-slip manoeuvre as described above the VCU 110C takes over control of the application of positive or negative torque to the driven wheels 112, 114 as required. As described above the driver is required to maintain the accelerator pedal 136 depressed by an amount sufficient to indicate that he wishes to continue the sideslip manoeuvre although the VCU 110C is commanding the torque delivery system 134 (which controls the amount of torque demanded from the engine 130) in order to provide the required torque to the driven wheels 112, 114.

In some embodiments the VCU 110C is arranged to establish a sideslip angle $\theta_R$ of around 20° although other values are also useful. As noted above the required sideslip angle $\theta_R$ may be arranged to decrease as a function of increasing vehicle speed. In some embodiments the VCU 110C is provided with a tuned envelope of permitted values of sideslip, the envelope being arranged to limit the maximum allowable value as a function of speed. Other arrangements are also useful.

In some embodiments the maximum allowable (and/or target value) of sideslip angle may be responsive to the value of the mu state signal 162.

In some embodiments the VCU 110C may be arranged to apply braking action to one or more wheels 102, 104, 112, 114 of the vehicle 100 in order to induce drift.

In some embodiments the VCU 110C may be arranged to limit a maximum yaw acceleration rate of the vehicle in order to enable the driver to maintain control of the vehicle 100.

It is to be understood that three key parameters in a stable sideslip manoeuvre are radius of turn (i.e. radius of path P), slideslip angle $\theta_R$ and an angular position of the steering wheel 106 (i.e. steering direction). It is to be understood that the radius of turn and steering direction provide an indication of the intended path of the vehicle 100. The VCU 110C controls the value of torque applied to each wheel 102, 104, 112, 114 responsive to the intended path in order to achieve the required slideslip angle $\theta_R$.

It is to be understood that in a neutral drift configuration each of the three parameters are of a substantially constant value.

In some embodiments, in one mode of operation the VCU 110C may be arranged to control the value of torque applied to each wheel 102, 104, 112, 114 in order to adapt the attitude of the vehicle so that the current angular position of the steering wheel 106 corresponds to a neutral position of the steering wheel 106 for the intended path P of the vehicle at the required sideslip angle $\theta_R$. Thus, if the vehicle is established in a turn at a required slip angle (of say 20°) the VCU 110C may control the vehicle 110 to maintain this required slip angle. If the driver subsequently changes the angular position of the steering wheel 106 he signifies a change in intended path of the vehicle 100. The VCU 110C may then command the application of positive or negative torque to wheels 102, 104, 112, 114 of the vehicle 110 in order to cause the vehicle 100 to assume a stable sideslip angle $\theta_R$ along the new intended path. The sideslip angle assumed for the new intended path may be the same angle as was assumed for the previous path.

In an alternative mode of operation of the VCU 110C, the VCU 110 controls the vehicle 100 to maintain a substantially constant radius of turn R by varying the value of sideslip angle $\theta_R$ responsive to the angular position of the steering wheel 106. The radius of turn may be selected by the driver to be one of a plurality of values pre-programmed into the VCU 110C.

In one example of a behaviour of a system according to an embodiment of the present invention, a driver may attempt to initiate drift mode (i.e. VCU-controlled sideslip mode) by selecting the mode by means of selector 110S and then turning the steering wheel so that it exceeds the prescribed angle for entry into the VCU-controlled sideslip mode. The driver must also depress the accelerator pedal 136 beyond the prescribed amount for entry into VCU-controlled sideslip mode. The remaining conditions set out in FIG. 4(a) must also be met.

If the driver keeps the steering wheel fixed in the position at which the driver initiated entry into the VCU-controlled sideslip mode and does not subsequently turn the steering wheel such that the wheels 102, 104 are directed in an opposite direction of turn in order to maintain the intended path the vehicle 100 will not enter the VCU-controlled sideslip mode. In other words, the VCU 110C will not take over control of the application of torque to the wheels 102, 104, 112, 114 in order to maintain a non-zero sideslip angle $\theta_R$ according to the selected drift mode. Rather the VCU 110C controls the vehicle 100 to reduce the sideslip angle $\theta_R$ to zero (or to a value below a prescribed threshold).

Thus it is to be understood therefore that the VCU 110C requires that the driver changes the steering direction from the position assumed when entry into VCU-controlled sideslip mode was initiated (step S205 of FIG. 4(a)) to a new position, at which substantially constant non-zero sideslip can be maintained for the intended vehicle path, before the vehicle 100 assumes VCU-controlled sideslip mode. If the driver does not enter this range then the VCU 110C will abandon entry into the VCU-controlled sideslip mode and the VCU 110C will not take over control of the application of torque to the wheels 102, 104, 112, 114 in order to maintain a non-zero sideslip angle $\theta_R$. As noted above the VCU 110C controls the vehicle 100 to reduce the sideslip angle $\theta_R$ to zero or to a value below a prescribed threshold.

As noted above, embodiments of the present invention have the feature that a driver may elect to establish the vehicle 100 in a condition in which the vehicle 100 is side-slipping whilst cornering, the vehicle being operable to assist the driver in maintaining a stable angle of sideslip. Thus, a driver wishing to perform a sideslip manoeuvre is able to do so without disabling an ESC, TCS or like feature of the vehicle. Thus, the ESC and TCS features may still be available to assist the driver when required.

In some embodiments the VCU 110C is arranged to receive an input from a driver in respect of a desired angle of sideslip that the driver wishes to establish and maintain when in VCU-controlled sideslip mode. As noted above, in some embodiments the VCU 110C may be operable automatically to determine a suitable value of sideslip responsive to the vehicle state when in VCU-controlled sideslip mode. In some embodiments the VCU 110C may be operable to determine a maximum allowable angle of sideslip responsive to vehicle state and to intervene to prevent the maximum angle being exceeded in the event the value of sideslip angle approaches the maximum allowable angle.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle sideslip control system adapted to maintain a prescribed non-zero target value of a sideslip angle while cornering, the system comprising a vehicle sideslip controller operable automatically to control at least one of a powertrain of the vehicle to apply a positive torque generated by an engine of the powertrain to one or more wheels of the vehicle, or a brake sub-system of the vehicle to apply a negative torque to one or more wheels of the vehicle to maintain said prescribed non-zero target value of sideslip angle.

2. A system as claimed in claim 1 arranged to determine an intended path of the vehicle responsive to one or more driver control inputs, the system being arranged to maintain the value of sideslip angle relative to the intended path.

3. A system as claimed in claim 1 wherein the sideslip controller is operable automatically to control the vehicle to assume and maintain the non-zero value of sideslip angle when one or more prescribed sideslip control entry conditions are met.

4. A system as claimed in claim 3 wherein the one or more prescribed sideslip control entry conditions include at least one selected from amongst the conditions that a transmission of the vehicle is set to a gear ratio within a prescribed range, a steering angle is within a prescribed range, an accelerator pedal position is within a prescribed range, a value of longitudinal slip of one or more driven wheels of the vehicle is greater than a prescribed value, a value of lateral slip of one or more wheels of the vehicle is greater than a prescribed value and a direction of yaw of the vehicle corresponds to a direction appropriate for the sideslip condition to be established.

5. A system as claimed in claim 1 wherein the sideslip controller is operable to determine a value of sideslip angle appropriate for a vehicle path selected by a driver, the vehicle path being determined by the controller responsive to steering angle selected by the driver.

6. A system as claimed in claim 1 wherein the sideslip controller is operable to control the vehicle to maintain a substantially constant radius of turn by varying the value of sideslip angle responsive to steering angle selected by the driver.

7. A vehicle comprising a sideslip control system as claimed in claim 1.

8. A vehicle as claimed in claim 7 wherein the vehicle is configured to drive only one pair of wheels thereof.

9. A vehicle as claimed in claim 7 wherein the vehicle is configured to drive four wheels thereof.

10. A vehicle as claimed in claim 7 wherein the vehicle is operable in a two wheel drive or four wheel drive mode.

11. A vehicle sideslip control system adapted to maintain a prescribed non-zero target value of a sideslip angle while cornering, the system comprising a vehicle sideslip controller operable to automatically control the vehicle to apply a positive or negative torque to one or more wheels of the vehicle to maintain said prescribed non-zero target value of sideslip angle, and wherein when the sideslip controller is controlling the vehicle to maintain the non-zero value of sideslip angle the controller is arranged to execute an exit sequence when one or more prescribed sideslip control exit conditions are met.

12. A system as claimed in claim 11 wherein the prescribed one or more sideslip control exit conditions include at least one selected from amongst the conditions that the transmission of the vehicle is set to a gear ratio that is not within the prescribed range for sideslip control entry, the steering angle is set to a value that is not within the prescribed range for sideslip control entry, the accelerator pedal position is not within the prescribed range for sideslip control entry, the value of longitudinal slip of one or more driven wheels of the vehicle is less than the prescribed value for sideslip control entry, a value of lateral slip of one or more wheels of the vehicle is less than the prescribed value for sideslip control entry and the direction of yaw of the vehicle corresponds to a direction that is not appropriate for the sideslip condition established.

13. A system as claimed in claim 11 wherein by means of said exit sequence the sideslip controller is operable to terminate maintenance of the non-zero sideslip angle when said one or more prescribed sideslip control exit conditions are met.

14. A system as claimed in claim 11 wherein by means of said exit sequence the sideslip controller is operable to automatically control the vehicle to reduce the value of sideslip angle when said one or more prescribed sideslip control exit conditions are met.

15. A method of controlling a vehicle comprising:

determining that a driver wishes to establish a non-zero value of sideslip; and controlling at least one of a powertrain or a brake subsystem of the vehicle by means of vehicle sideslip control means automatically to maintain a prescribed non-zero target value of sideslip by applying positive torque generated by an engine of the powertrain or negative torque to one or more wheels of the vehicle.

* * * * *